United States Patent
Lin et al.

(10) Patent No.: US 12,014,024 B2
(45) Date of Patent: Jun. 18, 2024

(54) METHOD AND SYSTEM FOR CREATING A TELEVISION MENU WITH MULTIPLE SETTINGS

(71) Applicant: REALTEK SEMICONDUCTOR CORP., Hsinchu (TW)

(72) Inventors: Yu-Jen Lin, Hsinchu (TW); Cheng-Hao Li, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 22 days.

(21) Appl. No.: 17/580,801

(22) Filed: Jan. 21, 2022

(65) Prior Publication Data

US 2022/0236839 A1     Jul. 28, 2022

(30) Foreign Application Priority Data

Jan. 27, 2021 (TW) .................................. 110103047

(51) Int. Cl.
*G06F 3/0482* (2013.01)
*G06F 3/0484* (2022.01)
*H04N 5/50* (2006.01)

(52) U.S. Cl.
CPC .......... *G06F 3/0482* (2013.01); *G06F 3/0484* (2013.01); *H04N 5/50* (2013.01)

(58) Field of Classification Search
CPC ........ G06F 3/0482; G06F 3/0484; H04N 5/50
See application file for complete search history.

(56) References Cited

U.S. PATENT DOCUMENTS

| | | | | | |
|---|---|---|---|---|---|
| 5,206,727 | A | * | 4/1993 | Ebihara ................... | H04N 5/211 348/614 |
| 2002/0112248 | A1 | * | 8/2002 | Takagi .................... | H04H 40/18 725/100 |
| 2009/0310034 | A1 | * | 12/2009 | Hayashi ........... | H04N 21/42204 348/739 |
| 2010/0110297 | A1 | * | 5/2010 | Kameoka ........... | H04N 21/4622 348/739 |
| 2011/0216043 | A1 | * | 9/2011 | Tamura .................... | G06F 3/042 345/175 |
| 2013/0151591 | A1 | * | 6/2013 | Lee ....................... | H04N 21/658 709/203 |

FOREIGN PATENT DOCUMENTS

| CN | 102118650 A | 7/2011 |
|---|---|---|
| CN | 102567028 A | 7/2012 |

\* cited by examiner

*Primary Examiner* — Kyu Chae
(74) *Attorney, Agent, or Firm* — Li & Cai Intellectual Property (USA) Office

(57) ABSTRACT

A method and a system for creating a television menu with multiple settings are provided. A television control circuit is used in a television device. The television control circuit performs the method. A memory is provided for storing multiple television menu settings with respect to multiple clients' demands. When the television device is activated, the television control circuit performs a menu-loading sequence that loads one of the television menu settings from the memory. The television control circuit parses the television menu setting and obtains control tags and corresponding setting parameters. The television menu is initiated and displayed on the television device based on the control tags and the setting parameters.

7 Claims, 5 Drawing Sheets

METHOD AND SYSTEM FOR CREATING A TELEVISION MENU WITH MULTIPLE SETTINGS

CROSS-REFERENCE TO RELATED PATENT APPLICATION

This application claims the benefit of priority to Taiwan Patent Application No. 110103047, filed on Jan. 27, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology for providing a television menu design, and more particularly to a method and a system for creating a television menu with multiple settings based on client demands.

BACKGROUND OF THE DISCLOSURE

For a manufacturer designing a TV chip, various versions of television menus need to be provided for various client demands. One of the solutions is to utilize different project managements with respect to the various demands, in which independent customized codes are created for every client and every demand. Therefore, multiple demands require multiple projects since every demand requires an individual design, i.e., the television menu design, and the various customized demands need more time for various designs to be provided.

In any project, the content of the television menu should be decided during the coding. When another client demand of the television menu is ordered, a new project should start since a different content of television menu is required by a different client. After the codes for the new project are compiled, a software program is installed in a television device.

In conventional technologies, the source codes with respect to multiple television menus are configured to be written to a memory of a TV chip when designing the TV chip. However, a certain amount of the memory is required.

SUMMARY OF THE DISCLOSURE

In response to the above-referenced technical inadequacy, the present disclosure provides a method and a system for creating a television menu with multiple settings. Since the manufacturer of the TV chip needs to provide different television menu designs including individual codes, compilations and installations for different clients and different demands, the present disclosure provides a method and a system for creating a television menu with multiple settings. As compared to the conventional provisions of multiple projects or multiple versions of codes of the television menus, the system for creating a television menu with multiple settings provides a novel programming framework that pre-designs and installs the content of various types of the television menu with respect to various clients' demands to a TV chip. Accordingly, the system can effectively reduce the development time of an engineering unit since the codes need not to be re-compiled and re-installed to the television device.

According to an exemplary example of the disclosure, the system for creating a television menu with multiple settings is configured to support various television menus required by multiple clients. The method for creating a television menu with multiple settings is implemented in a television control circuit in a television device. The television control circuit can be a TV chip for operating system of a television. The television system includes a memory that is used to store multiple television menu settings with respect to multiple clients' demands.

According to one embodiment of the method for creating a television menu with multiple settings operated in the television control circuit, when the television device is activated, the television control circuit loads one of the television menu settings from the memory, and then parses control tags and setting parameters corresponding to every control tag in the television menu setting. After that, a television menu displayed on a television device can be initiated according to the control tags and the corresponding setting parameters.

In an aspect of the disclosure, the television menu setting can be edited according to a script structure. After the television menu setting has been edited, the television menu setting is stored or burned into a memory that can be a memory of the television control circuit or a system memory of the television device. When the television device is activated, the television control circuit performs a menu-loading sequence for loading from the memory the television menu setting that meets the client demand.

Further, the control tag includes multiple menu items that form a television menu. The television menu setting records the multiple menu items and a hierarchical relationship among the menu items being edited based on the client demand.

Further, the control tags in the television menu setting at least include a menu title, a signal source and a television system; the setting parameters corresponding to every control tag includes an icon, a channel, a digital or analog channel setting, setting of television/HDMI/AV/VGA, setting of DVB/ATSC/DTMB/ISDB, a positive list or a negative list.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
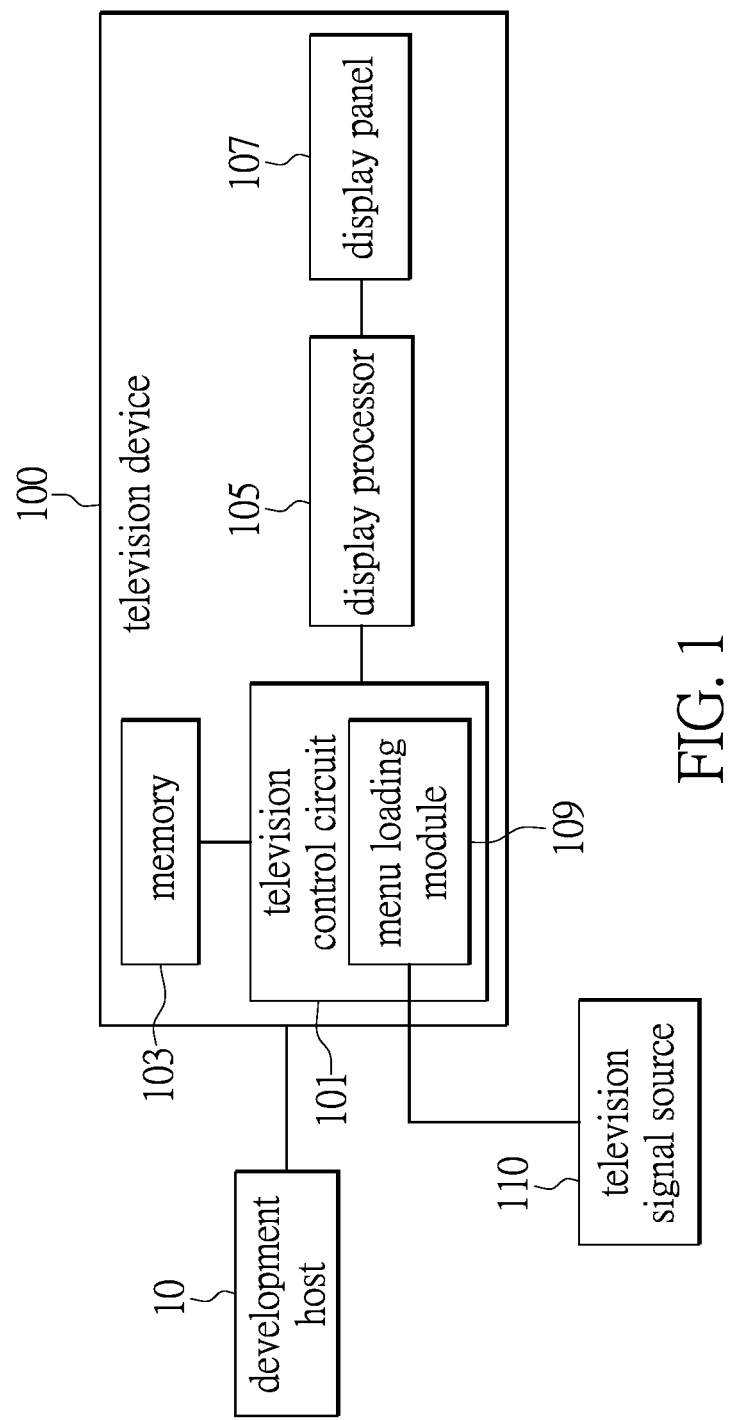
FIG. 1 is a framework diagram depicting a system including a development host and a television device for implementing a method for creating a television menu with multiple settings according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure is related to a method and a system for creating a television menu with multiple settings. A programming framework is provided. In the programming framework, the menu content is designed in advance and then loaded to a television device. Accordingly, the codes for generating the menu content need not to be re-compiled and loaded to a device, i.e., the television device. The method allows the design of the television menu to be more flexible and reduces development time used by a manufacturer to develop a TV chip. The system for creating the television menu with multiple settings is preferably adapted to a television control circuit of the television device. The television control circuit can be the TV chip in a television system.

The clients of the manufacturer of the TV chip may propose different combinations of menu items. Under various television systems such as DVB, ATSC, DTMB and ISDB, the various types of input signals may require different combinations of menu items. According to the programming framework provided in the method for creating the television menu with multiple settings, multiple television menus such as menu1, menu2, menu3, up to menuN are used to define the combinations of menu items for different clients. The definition of every television menu (menuN) includes control tags defined for multiple menu items in the television menu as the client demands. The television menu setting records the multiple menu items and a hierarchical relationship among the menu items being edited according to a client demand. Various scenarios for showing the television menu are designed for different television systems and input signals. The scenario for showing the television menu can adopt a positive list or a negative list.

Reference is made to FIG. 1, which depicts a system including a television device and a development host that performs the method for creating the television menu with multiple settings according to one embodiment of the present disclosure.

In the drawing, a development host 10 of a manufacturer of a TV chip is provided. The development host 10 can be a computer host that is provided for a developer to write and compile programs. The development host 10 is then connected with a television device 100 via a specific connection. A television control circuit 101 is one of the main elements of the television device 100. The television device 100 includes a memory 103 which is used to store software or firmware programs needed for loading a television menu setting and operating a television system. The memory 103 is electrically connected to the television control circuit 101. In the method, the television control circuit 101 is to generate the television menu. In addition to process television signals transmitted from a specific television signal source 110, the television control circuit 101 embodies a menu-loading module 109 through software or firmware programs. The menu-loading module 109 performs a menu-loading sequence that is used to load a television menu setting provided by the development host 10. The television menu setting is then stored to the memory 103 of the television device 100. The menu-loading sequence is also used to load a television menu setting from the memory 103 when the television device 100 is activated. The television menu setting is converted to a menu which is configured to be displayed on a television screen. The menu is transformed to a menu picture by a display processor 105, and the menu picture is then displayed on television screen through a display panel 107.

In an exemplary example, a first client requests that a pictorial menu is shown before entering a television screen when the television device is activated, and a menu picture and a channel menu are shown after entering the television screen. On the contrary, a second client requests that both the menu picture and the channel menu are shown before and after entering the television screen when the television device is activated. The menu picture includes setting parameters such as a brightness, a contrast, a color, and a font of the menu. The channel menu includes a digital channel and an analog channel.

Figure 2:
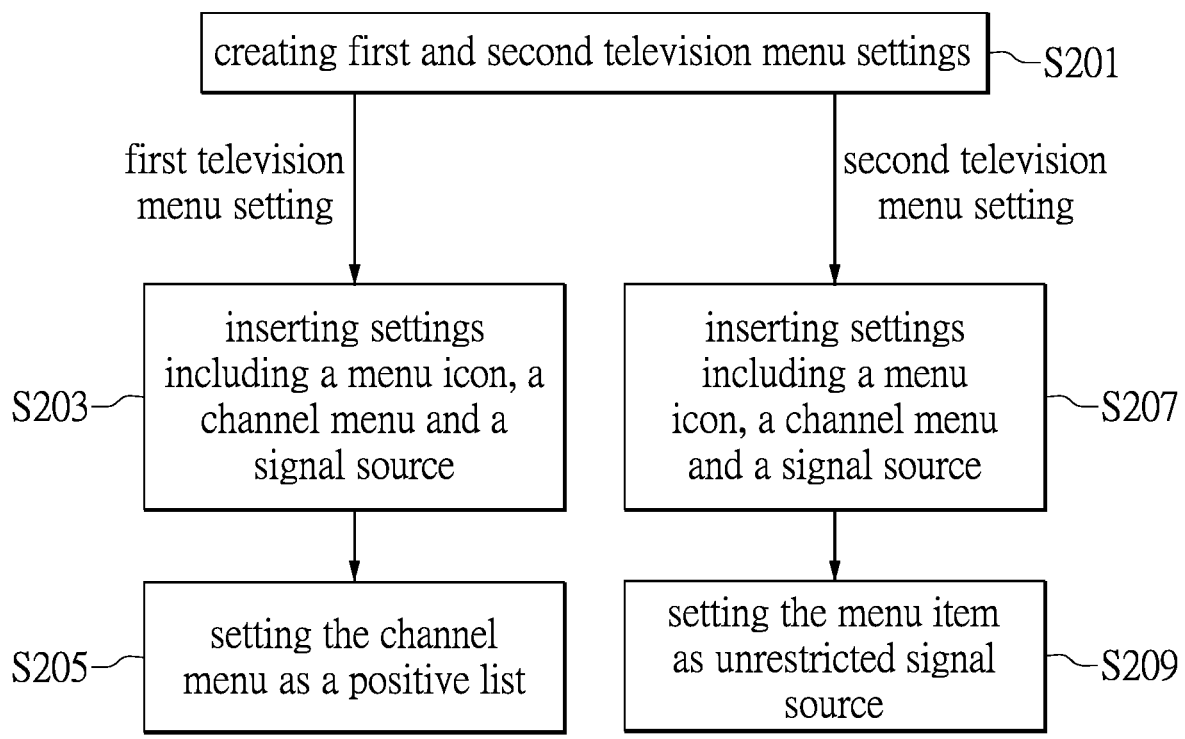
FIG. 2 is an exemplary flow chart describing the method for creating the television menu with multiple settings according to one embodiment of the present disclosure.

The television menus corresponding to the requests of the two clients can be formed through the method for creating the television menu with multiple settings of the present disclosure, and reference is made to FIG. 2.

In the development host, a developer codes two television menu settings including a first television menu setting and a second television menu setting based on the requests made by the first client and the second client respectively (step S201).

Based on the first client's request, a menu picture and a channel menu are imbedded in the first television menu setting, and a signal source is set in the first television menu setting (step S203). Since the first client requests that a pictorial menu is shown before entering the television screen (without TV signals) and both the menu picture and the channel menu are shown after entering the television screen (with TV signals), a positive list of the television menu is set in the channel menu (step S205). The positive list of the television menu is shown only if a television signal source is connected. In some other setting items, an item "signal source restriction" is set as "TV."

Next, based on the second client's request, both the menu picture and the channel menu are imbedded in the second television menu setting, and a corresponding setting of signal source is also imbedded in the second television menu setting (step S207). Further, according to the second client's request that the menu picture and the channel menu are shown before and after entering a television screen (i.e., without or with TV signals), the menu items in the second television menu setting are all set as "unrestricted signal source" (step S209), indicating that the item "signal source restriction" is set as "unrestricted."

The following exemplarily shows the control tags and corresponding setting parameters in the television menu setting in accordance with various clients' demands. For example, the control tags are such as "menu title", "signal source" that indicates a signal source restriction type, signal source restriction and means for signal source restriction, and "television system." The setting parameters correspond to the control tags. The parameters of the menu title include an icon, a channel, and a digital/analog television setting. The signal source can be TV, HDMI, AV and/or VGA. The television system can be DVB, ATSC, DTMB or ISDB. Other control tags such as a positive list and a negative list are also included.

Here are the terms of the abbreviations or explanations of the above terminologies. HDMI is the abbreviation of high definition multimedia interface; AV is a video signal with mixed luminance and chrominance; VGA is the abbreviation of video graphics array; DVB is the abbreviation of Digital Video Broadcasting-Terrestrial; ATSC is the abbreviation of Advanced Television Systems Committee; DTMB is the abbreviation of Digital Terrestrial Multimedia Broadcast; and ISDB is the abbreviation of Integrated Services Digital Broadcasting.

Followings are examples of the control tags and the corresponding setting parameters of the first television menu setting. The parameters of the first television menu include an icon and a channel. The signal source can be set as TV, HDMI, AV or VGA. An icon menu is shown before entering a television screen, and the icon is shown after entering a television screen, and a channel menu is shown when a signal source meets the setting. The present example adopts a positive list. A menu title "icon", and signal source restriction type and signal source restriction are set as unrestricted in a menu setting 1. In a menu title "channel", a positive list is applied to the signal source restriction type, the signal source restriction is set to TV, but the means for signal source restriction is hidden. Part of a script of the television menu setting is exemplarily shown as follows.

```
menu setting 1
{
    "menu title" : "icon",
    "signal source restriction type" : unrestricted,
    "signal source restriction" : unrestricted,
},
{
    "menu title" : "channel",
```

-continued

```
    "signal source restriction type" : positive list,
    "signal source restriction" : TV,
    "means for signal source restriction" : hidden,
},
```

An example of the first television menu setting with a negative list that excludes the setting parameters is as follows.

```
menu setting 1
{
    "menu title" : "icon",
    "signal source restriction type" : unrestricted,
    "signal source restriction" : unrestricted,
},
{
    "menu title" : "channel",
    "signal source restriction type" : negative list,
    "signal source restriction" : HDMI, AV,
    "means for signal source restriction" : hidden,
},
```

Furthermore, a sub menu of a channel can be set with a television system source (i.e., DVB, ATSC, DTMB, or ISDB), and a function item "antenna auto scan" can be set under DVB signals. The menu setting 1 adopts a positive list as follows.

```
menu setting 1
{
    "menu title" : "Antenna_Auto_Scan",
    "television system restriction type" : positive list,
    "television system restriction" : DVB,
    "means for restricting television system" : hidden;
},
```

With a negative list as an example as described below, both the negative list and the positive list have the same effect.

```
menu setting 1
{
    "menu title" : "Antenna_Auto_Scan",
    "television system restriction type" : negative list,
    "television system restriction" : ATSC, DTMB, ISDB,
    "means for television system restriction" : hidden,
},
```

The control tags and the corresponding setting parameters of the second television menu setting are referred to the following example. In the second television menu setting, both icon and audio menus are shown in the television menu before and after entering a television screen. The menu item is set as "unrestricted signal source."

```
menu setting 2
{
    "menu title" : "icon",
    "signal source restriction type" : unrestricted,
    "signal source restriction" : unrestricted,
},
{
    "menu title" : "channel",
    "signal source restriction type" : unrestricted,
    "signal source restriction" : unrestricted,
},
```

In one further example, a third client requests that a channel menu includes both a digital television setting and an analog television setting. In the meantime, a fourth client requests that the channel menu only includes the digital television setting.

Figure 3:
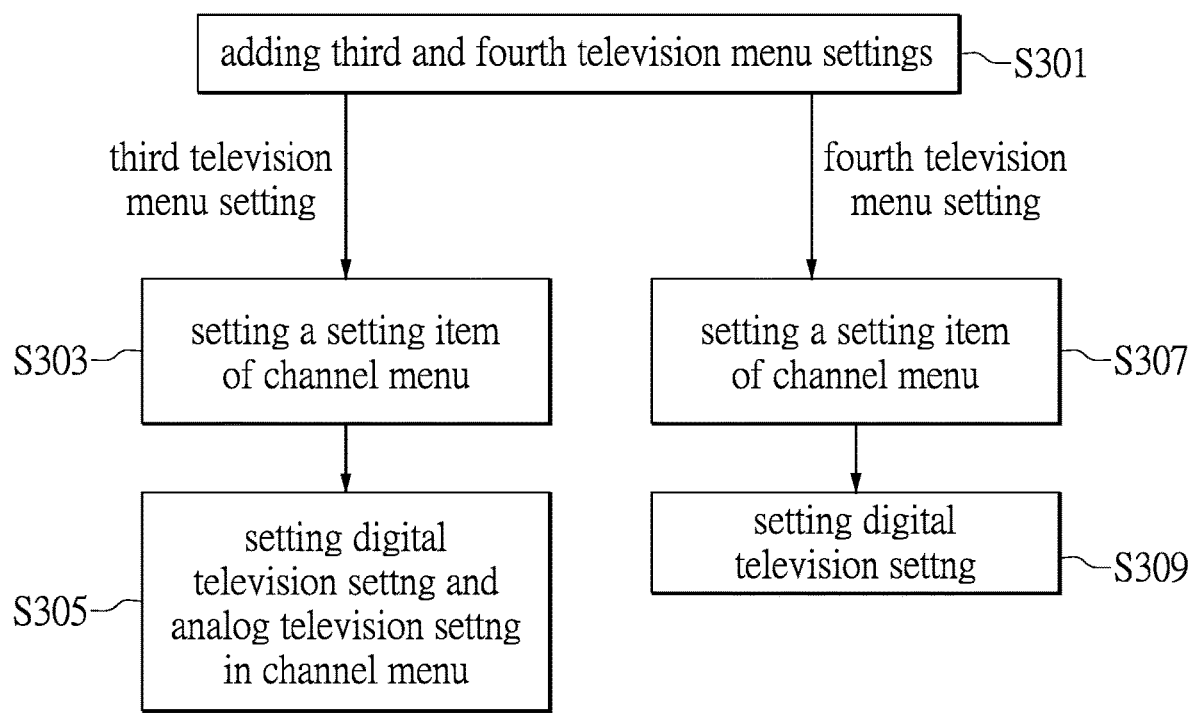
FIG. 3 is another exemplary flow chart describing the method for creating the television menu with multiple settings according to another embodiment of the present disclosure.

In the method for creating the television menu with multiple settings, a television menu is set, referring to the flow chart of FIG. 3, for meeting both the requests of the two clients. In the development host, the developer writes a television menu setting based on the requests made by the third client and the fourth client. Firstly, two new television menu settings, i.e., a third television menu setting and a fourth television menu setting are written (step S301).

Next, in the third television menu setting, a setting item of channel menu is set (step S303). In the third television menu setting, the channel menu requested by the third client includes both the digital television setting and the analog television setting, that is, in a next hierarchy of the channel menu, both the digital television setting and the analog television setting are included (step S305). In the meantime, the "signal source restriction" is set to be unrestricted.

In the fourth television menu setting, a setting item of channel menu is also set (step S307). According to the request of the fourth client, a next hierarchy of the channel menu only includes the digital television setting (step S309).

An exemplary example of the control tags and the corresponding setting parameters of the third television menu setting are as follows. A setting item in a channel menu includes a digital television setting and an analog television setting. A next hierarchy of the channel menu includes both the digital television setting and the analog television setting.

```
menu setting 3
{
    "menu title" : "channel",
    "signal source restriction type" : unrestricted,
    "signal source restriction" : unrestricted,
    "sub menu" : {
        "menu title" : "digital television setting",
        "signal source restriction type" : unrestricted,
        "signal source restriction" : unrestricted,
    }, {
        "menu title" : "analog television setting",
        "signal source restriction type" : unrestricted,
        "signal source restriction" : unrestricted,
    },
}
```

An exemplary example of the control tags and the corresponding setting parameters of the fourth television menu setting are as follows. A channel menu only includes a digital television setting, and therefore a next hierarchy of the channel menu only includes the digital television setting.

```
menu setting 4
{
    "menu title" : "channel",
    "signal source restriction type" : unrestricted,
    "signal source restriction" : unrestricted,
    "sub menu" : {
        "menu title" : "digital television setting",
        "signal source restriction type" : unrestricted,
        "signal source restriction" : unrestricted,
    },
}
```

Figure 4:
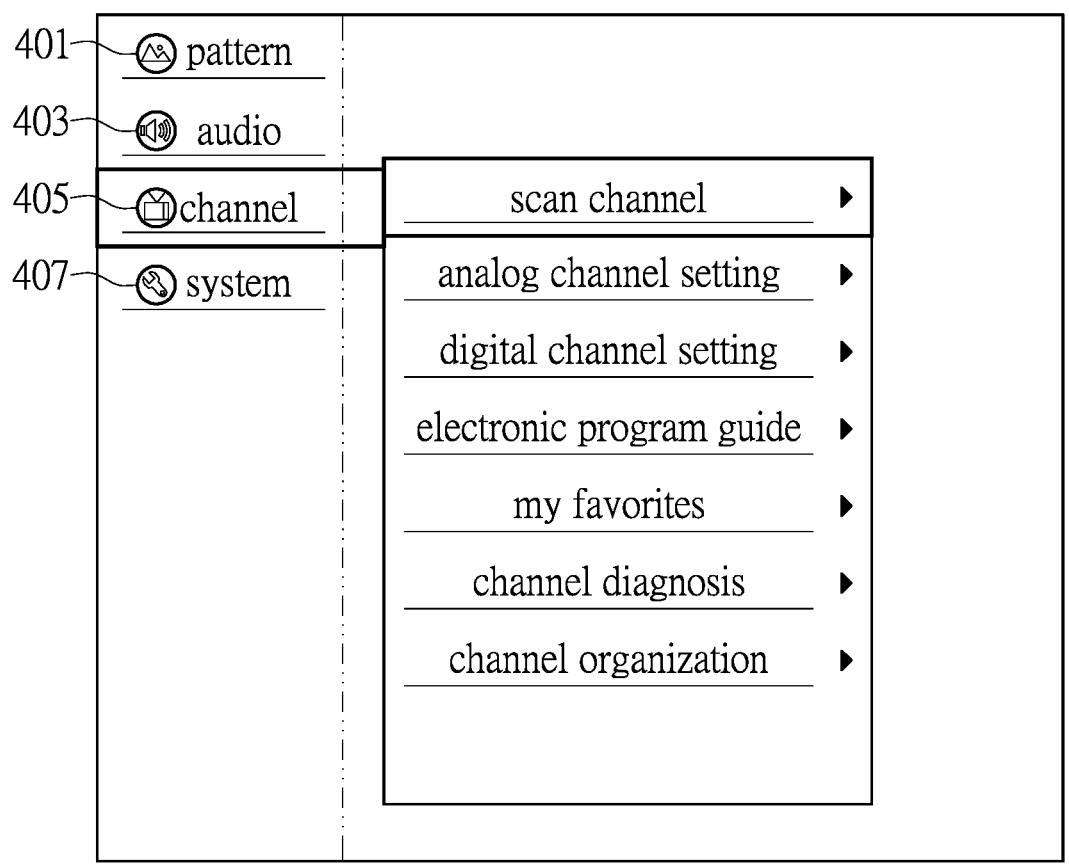
FIG. 4 is a schematic diagram depicting the television menu created by the method for creating the television menu with multiple settings in one embodiment of the present disclosure.

In view of the above examples showing the method for creating the television menu with multiple settings, reference is made to FIG. 4, which shows a schematic diagram depicting a television menu created in the method.

A manufacturer of a TV chip packages multiple settings of the television menu into a television menu setting. The television menu setting is written into the TV chip. The TV chip having the television menu setting is then submitted to a television manufacturer. After the television device is activated, the television menu setting is executed according to requests made by the television manufacturer so as to form a television menu 40 shown in FIG. 4. A main menu includes certain setting items such as a pattern 401, an audio 403, a channel 405 and a system 407. For example, a setting menu of the channel 405 includes items such as a scan channel, an analog channel setting, a digital channel setting, an electronic program guide, "my favorites", a channel diagnosis, and a channel organization.

Figure 5:
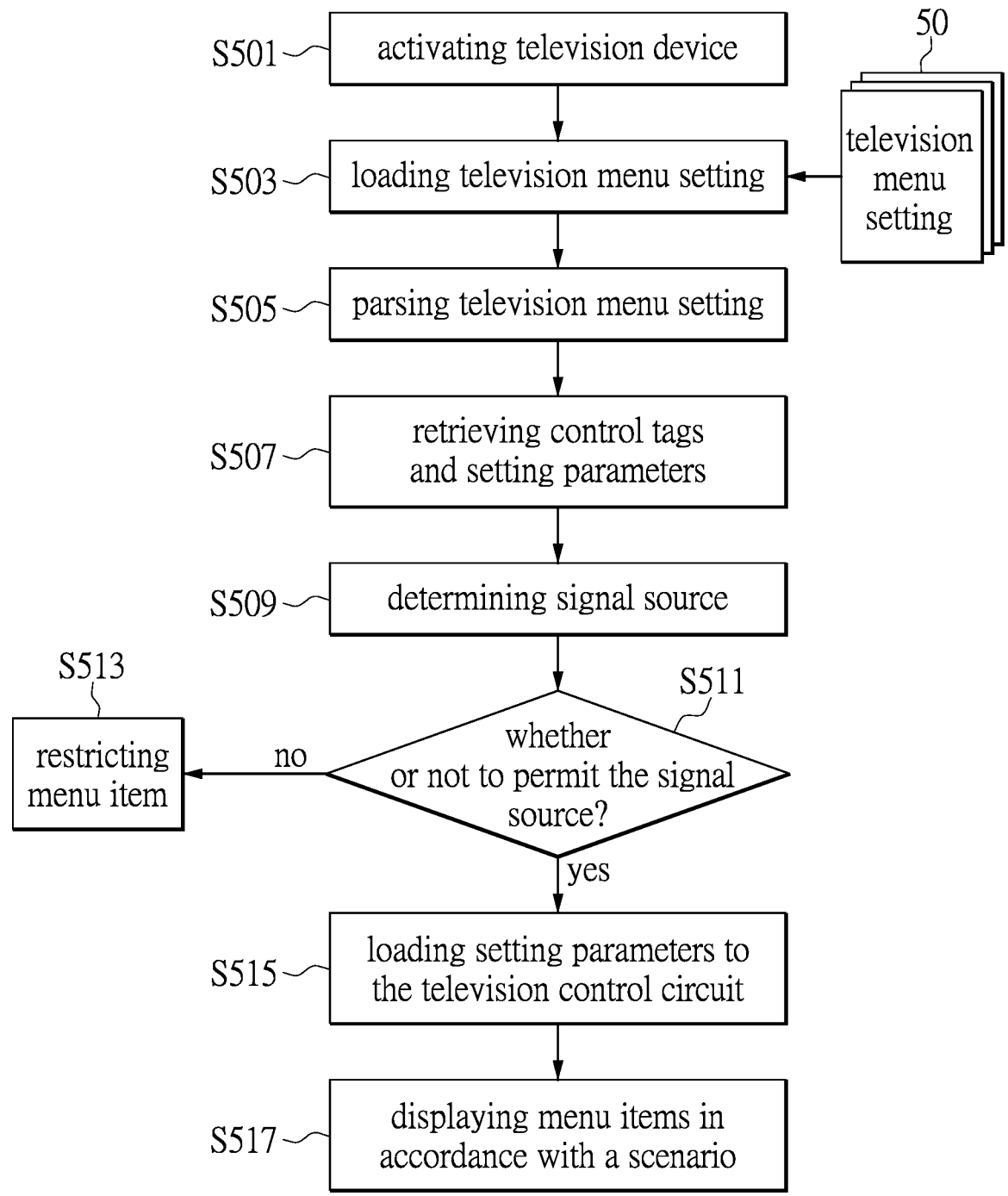
FIG. 5 is a flow chart describing a manner for displaying a menu in one embodiment of the present disclosure.

Through the method for creating the television menu with multiple settings, the television menu setting is created and then stored or burned into a memory of the television device. A circuit system including the television control circuit 101, the memory 103, the menu-loading module 109 and related software and hardware of FIG. 1 are submitted to the client. In a client end, after the television device is activated, the method shown in FIG. 5 is performed. The memory of the television device stores multiple television menu settings that are in accordance with multiple clients' demands. It should be noted that the television control circuit 101 implements the TV chip and the memory can be the memory of the TV chip or the system memory of the television device.

In a beginning, after a television device is activated (step S501), hardware circuit components in the television device are initialized. A television control circuit loads one of the television menu settings 50 from a memory of the television device (step S503). The loaded television menu setting 50 is parsed by the television control circuit (step S505) so as to retrieve a specific television menu setting corresponding to a client demands. Further, the television control circuit also confirms various control tags and setting parameters required by the client in the television menu setting (step S507), e.g., the control tags and setting parameters in the above-referenced first, second, third or fourth television menu setting. For example, the system allows the client such as a television manufacturer to choose one of the television menu settings 50 from the memory. According to the above-mentioned example, the setting parameter of the control tag "menu title" in the menu setting 1 is set as "Antenna_Auto_Scan" that indicates a function of automatic scan of an antenna. Further, the setting parameter of the television system restriction type is set as "negative list" that indicates that the television system restriction cannot be ATSC, DTMB or ISDB, and the means for television system restriction is not hidden.

Afterwards, the setting parameters of the control tags are loaded to a television control circuit, and a television menu is initiated based on the client's request. When the television control circuit is in operation, the related parameters of the television menu setting are applied to the television control circuit. In one of the embodiments, such as in step S509, the television control circuit determines a signal source and/or a television system according to received video signals. The television control circuit then determines whether or not the signal source, e.g., TV, HDMI, AV or VGA, is permitted according to the setting parameters and/or determines whether or not the television system, e.g., DVB, ATSC, DTMB and/or ISDB, is permitted according to the setting parameters.

If the signal source is determined not to be permitted according to the setting parameters in the television menu setting, then the signal source does not match the parameter "signal source restriction" and step S513 is performed to restrict a specific menu item, and the menu item is hidden or not provided to be selected.

On the contrary, if the signal source is determined to be one of the permitted sources set in the television menu setting or the television menu setting does not restrict any signal source, step S515 is performed to load the related setting parameters to the television control circuit. Further, in step S517, some menu items according to a specific scenario are shown. In step S517, the scenario to show the menu items or channels is obtained according to the control tags. The scenario determines whether or not to show the related icons or channels. Finally, a display processor displays the menu items on a television screen.

In summation, according to the above embodiments of the method for creating the television menu with multiple settings, a television menu setting is written based on a script structure for setting the control tags such as menu title, signal source and television system and the setting parameters such as icon, channel, digital/analog channel setting, signal source such as TV, HDMI, AV and VGA, television system such as DVB, ATSC, DTMB and ISDB, and positive list or negative list according to the various client requests for the television menu. The control tags and the corresponding setting parameters in the television menu setting are configured to define various combinations of the menu items and various hierarchical relationships among the items that meet various requests of the television menus of the clients. The television menu setting is then loaded to the television control circuit in advance so as to effectively reduce the development time of an engineering unit since the codes need not to be re-compiled and re-installed to the television device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for creating a television menu with multiple settings, operated in a television control circuit disposed in a television device, comprising:
    performing, by the television control circuit, a menu-loading sequence when the television device is activated;
    loading one of television menu settings that meets a client demand from a memory of the television control circuit, wherein the memory stores multiple television menu settings, which are edited according to a script structure and are stored or burned into the memory after editing, corresponding to multiple client demands;
    parsing control tags in the one of the television menu settings and setting parameters corresponding to every control tag in the television control circuit, wherein the setting parameters corresponding to every control tag include an icon, a channel, a digital or analog channel setting; and
    initiating the television menu according to the control tags and the corresponding setting parameters;
    wherein each of the control tags includes multiple menu items that form the television menu, and the television menu setting records the multiple menu items and a hierarchical relationship among the menu items being edited according to a client demand.

2. The method according to claim 1, wherein the control tags in the television menu setting at least include a menu title, a signal source and a television system; the setting parameters corresponding to every control tag further includes setting of television/HDMI/AV/VGA, setting of DVB/ATSC/DTMB/ISDB, a positive list or a negative list.

3. The method according to claim 2, wherein the television control circuit determines the signal source and the television system according to received video signals, and determines whether or not the signal source or the television system is permitted by a system of the television device according to the television menu setting.

4. The method according to claim 1, wherein, when the signal source fails to accord with the setting parameters of the television menu setting, the menu items of the control tag are restricted.

5. A system for creating a television menu with multiple settings, comprising:
    a television control circuit including a memory used in a television device;
    wherein, the television control circuit performs a menu-loading sequence when the television device is activated, the television control circuit loads one of the television menu settings that meets a client demand from the memory and parses control tags in the television menu setting and setting parameters corresponding to every control tag so as to initiate the television menu displayed on the television device according to the control tags and the corresponding setting parameters; wherein the memory stores multiple television menu settings corresponding to multiple clients' demands, and the setting parameters corresponding to every control tag include an icon, a channel, a digital or analog channel setting;
    wherein, the television menu settings are edited according to a script structure and is stored or burned into the memory of the television control circuit after editing; each of the control tags includes multiple menu items that form the television menu, and the television menu setting records the multiple menu items and a hierarchical relationship among the menu items being edited according to a client demand.

6. The system according to claim 5, wherein the control tags in the television menu setting at least include a menu title, a signal source and a television system; the setting parameters corresponding to every control tag further includes setting of television/HDMI/AV/VGA, setting of DVB/ATSC/DTMB/ISDB, a positive list or a negative list.

7. The system according to claim 6, wherein the television control circuit determines the signal source and the television system according to received video signals, and determines whether or not the signal source or the television system is permitted by a system of the television device according to the television menu setting.

* * * * *